(12) United States Patent
Frykberg

(10) Patent No.: US 11,186,138 B2
(45) Date of Patent: Nov. 30, 2021

(54) VEHICLE THERMAL MANAGEMENT SYSTEM

(71) Applicant: Ningbo Geely Automobile Research & Development Co., Ltd., Ningbo (CN)

(72) Inventor: Emil Frykberg, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/017,006

(22) Filed: Sep. 10, 2020

(65) Prior Publication Data
US 2020/0406704 A1 Dec. 31, 2020

Related U.S. Application Data

(63) Continuation of application No. PCT/CN2019/077136, filed on Mar. 6, 2019.

(30) Foreign Application Priority Data

Apr. 4, 2018 (EP) .................................... 18165660

(51) Int. Cl.
*B60H 1/00* (2006.01)
*B60L 58/27* (2019.01)
*B60L 58/26* (2019.01)

(52) U.S. Cl.
CPC .......... *B60H 1/00278* (2013.01); *B60L 58/26* (2019.02); *B60L 58/27* (2019.02); *B60H 2001/00307* (2013.01)

(58) Field of Classification Search
CPC ...... B60H 1/00278; B60H 2001/00307; B60H 1/323; B60H 1/004; B60H 1/00428;
(Continued)

(56) References Cited

U.S. PATENT DOCUMENTS 8,753,762 B2 6/2014 Major
2009/0249807 A1 10/2009 Nemesh
(Continued)

FOREIGN PATENT DOCUMENTS

CN 101551175 A 10/2009
CN 103534114 A 1/2014
(Continued)

OTHER PUBLICATIONS

International Search Report and Written Opinion from corresponding International Application No. PCT/CN2019/077136, dated May 27, 2019, 8 pages.

*Primary Examiner* — Christopher R Zerphey
*Assistant Examiner* — Melodee Jefferson
(74) *Attorney, Agent, or Firm* — Tucker Ellis LLP

(57) ABSTRACT

A vehicle thermal management system includes a refrigerant system, a first valve, a second valve, a third valve, a first thermally managed assembly, a second thermally managed assembly, a chiller, and a radiator, where the chiller is connected to the refrigerant system, and the chiller and the radiator respectively are arranged for cooling and/or heating the first and/or the second thermally managed assembly. In a connected mode for cooling or heating the first thermally managed assembly and the second thermally managed assembly, the first thermally managed assembly and the second thermally managed assembly are connected to each other via the first valve, the second valve, and the third valve, where the first thermally managed assembly and the second thermally managed assembly are connectable to the chiller and/or the radiator in a connected thermal control loop.

16 Claims, 13 Drawing Sheets

(58) Field of Classification Search
CPC ..... B60H 1/00392; B60L 58/26; B60L 58/27; B60L 1/003; B60L 2240/545; H01M 10/613
See application file for complete search history.

(56) References Cited

U.S. PATENT DOCUMENTS

| | | |
|---|---|---|
| 2012/0225341 A1 | 9/2012 | Major |
| 2012/0297809 A1 | 11/2012 | Carpenter |
| 2014/0216709 A1* | 8/2014 | Smith ................ B60H 1/00278 165/287 |
| 2015/0273976 A1 | 10/2015 | Enomoto |
| 2016/0344075 A1* | 11/2016 | Blatchley .............. B60W 20/15 |
| 2017/0211462 A1 | 7/2017 | Chen |
| 2018/0072130 A1 | 3/2018 | Kim |
| 2018/0354339 A1 | 12/2018 | Smith |

FOREIGN PATENT DOCUMENTS

| | | |
|---|---|---|
| CN | 103972607 A | 8/2014 |
| CN | 107813673 A | 3/2018 |

\* cited by examiner

VEHICLE THERMAL MANAGEMENT SYSTEM

RELATED APPLICATION DATA

This application is a continuation of International Patent Application No. PCT/CN2019/077136, filed Mar. 6, 2019, which claims the benefit of European Patent Application No. 18165660.4, filed Apr. 4, 2018, the disclosures of which are incorporated herein by reference in their entireties.

TECHNICAL FIELD

The present disclosure relates to a vehicle thermal management system comprising a refrigerant system, a chiller, and a radiator, where the chiller is connected to the refrigerant system. The chiller and the radiator are arranged for cooling or heating a first unit and a second unit of the thermal management system.

BACKGROUND

Vehicle thermal management systems are commonly used in today's vehicles for controlling the temperature ranges of different vehicle units, such as for example battery units, power electronics units, heating, ventilation and air conditioning (HVAC) systems, and other types of vehicle component units being part of the vehicle construction. In for example new energy vehicles, such as for example hybrid or electric vehicles, including battery electric vehicles, fuel-cell electric vehicles and plug-in hybrid electric vehicles, the high voltage battery components used for providing energy to the electric motors as well as the power electronic components need to be temperature controlled. The temperature controlling may depend on for example the driving conditions of the vehicle, the ambient temperature, and the type of components used in the vehicle system. The thermal management systems are therefore constructed for cooling or heating the vehicle units.

For new energy vehicles, the thermal system needs a redesign compared to the systems used in traditional vehicles with internal combustion engines, since the amount of heat energy created will be much less and not enough to heat the car properly. In order to have a good interior climate in the car, some kind of climate system needs to be available. A common thermal system for new energy vehicles is a system with heat pump capabilities. Heat pump capability systems commonly used today are based on traditional vehicle systems and use complex add-on components and features in order to achieve a desired heat pump function. These systems take up extra space in the vehicle, are complex in construction and design, and are also expensive.

The vehicle thermal management systems used often comprise one or more thermal control loops with a heat transfer fluid that is used for heating and cooling the vehicle components. The control loops are connected to the vehicle units with conduits and often radiators and a chiller are connected to the one or more thermal control loops. The vehicle thermal management systems are commonly equipped with a refrigerant system that is used for cooling the passenger compartment or cabin of the vehicle via the HVAC system. Some vehicle thermal control systems are provided with two or more thermal control loops, where each thermal control loop is used for heating and or cooling a specific vehicle unit. These systems are as described above complex in design and construction. Further, the systems are often non-flexible and expensive.

There is thus a need for an improved thermal vehicle management system, where the system is simple in design and construction with few components compared to traditional systems used.

SUMMARY

An object of the present disclosure is to provide a vehicle thermal management system where the previously mentioned problems are avoided. This object is at least partly achieved by the features of the independent claims. The dependent claims contain further developments of the vehicle thermal management system.

The disclosure concerns a vehicle thermal management system comprising a refrigerant system, a first valve, a second valve, a third valve, a first unit, a second unit, a chiller, and a radiator, where the chiller is connected to the refrigerant system, and the chiller and the radiator respectively are arranged for cooling and/or heating the first unit and/or the second unit. In a connected mode for cooling or heating the first unit and the second unit, the first unit and the second unit are connected to each other via the first valve, the second valve, and the third valve, where the first unit and the second unit are connectable to the chiller and/or the radiator in a connected thermal control loop. In separated modes for cooling and/or heating the first unit and/or the second unit, the first unit and the second unit are separated from each other via the first valve, the second valve and the third valve. In a first separated mode the first unit is connectable to the chiller in a first separated thermal control loop and the second unit is connectable to the radiator in a second separated thermal control loop, and in a second separated mode the first unit is connectable to the radiator in a third separated thermal control loop and the second unit is connectable to the chiller in a fourth separated thermal control loop. Each of the first valve, the second valve and the third valve is controllable into a first valve position and a second valve position, and depending on the valve positions the connected or separated thermal control loops are formed.

Advantages with these features are that the vehicle thermal management system can be made more efficient and flexible compared to traditional systems used. Further, the system can be designed and constructed in a non-complex way with few components in order to provide a cheaper solution. The different operational modes are used for controlling the cooling or heating of the units in a flexible and efficient way and the system can depending on driving conditions, ambient temperature and type of vehicle be connected or separated in the different operational modes. The valves are used for controlling the system and depending on the valve position the different operational modes are established.

According to an aspect of the disclosure, the first separated mode the first separated thermal control loop and the second separated thermal control loop are having different temperature ranges, and in the second separated mode the third separated thermal control loop and the fourth separated thermal control loop are having different temperature ranges. In this way the system can in the separated modes control the cooling or heating of the connected units with different temperature ranges if desired. The system can be designed in a flexible way with few components involved and the different operational modes can be used for controlling the temperature ranges in the different separated thermal control loops. The temperature ranges can vary and may be dependent on the driving conditions and ambient temperature variations.

According to another aspect of the disclosure, the system further comprises a first circulation pump and a second circulation pump circulating heat transfer fluid in the connected or separated thermal control loops. To provide efficient heating or cooling of the connected units, the circulation pumps are used for efficiently distributing the heat transfer fluid in the different thermal control loops.

According to a further aspect of the disclosure, heat transfer fluid is circulated in the first separated thermal control loop and the third separated thermal control loop by the first circulation pump, and heat transfer fluid is circulated in the second separated thermal control loop and the fourth separated thermal control loop by the second circulation pump. The pumps are used for the different separated thermal control loops so that the heat transfer fluid can be efficiently distributed in each separated loop to the respective connected units.

According to an aspect of the disclosure, heat transfer fluid is circulated in the connected thermal control loop by the first circulation pump and/or the second circulation pump. The pumps can in the connected thermal control loop be used together if needed depending on the driving conditions of the vehicle or alternatively used separately if desired. This is providing a flexible system with different alternatives for distributing the heat transfer fluid.

According to further aspects of the disclosure, in the first separated mode the first valve is positioned in the first valve position, the second valve is positioned in the first valve position, and the third valve is positioned in the first valve position. In the second separated mode the first valve is positioned in the second valve position, the second valve is positioned in the second valve position, and the third valve is positioned in the second valve position. The valve positions are used for efficiently controlling the different operational modes of the system.

According to another aspect of the disclosure, in the first separated mode the first separated thermal control loop comprises; the first unit connected to the first valve via a first conduit, the first valve connected to the chiller via a second conduit and a third conduit, the chiller connected to the third valve via a fourth conduit, the third valve connected to the first unit via, a fifth conduit and a sixth conduit; and the second separated thermal control loop comprises; the second unit connected to the second valve via a seventh conduit, the second valve connected to the radiator via an eighth conduit and a ninth conduit, the radiator connected to the second unit via a tenth conduit, an eleventh conduit and a twelfth conduit. In the first separated mode, the first unit is connected to the chiller in the first separated control loop, and the second unit is connected to the radiator in the second separated control loop. The conduits are used for connecting the different components and the valves are used for controlling the different operational modes of the system.

According to an aspect of the disclosure, in the second separated mode the third separated thermal control loop comprises; the first unit connected to the first valve via the first conduit, the first valve connected to the radiator via a thirteenth conduit and the ninth conduit, the radiator connected to the first unit via the tenth conduit, a fourteenth conduit and the sixth conduit; and the fourth separated thermal control loop comprises; the second unit connected to the second valve via the seventh conduit, the second valve connected to the chiller via a fifteenth conduit and the third conduit, the chiller connected to the third valve via the fourth conduit, the third valve connected to the second unit, via a sixteenth conduit and the twelfth conduit. In the second separated mode, the first unit is connected to the radiator in the third separated control loop, and the second unit is connected to the chiller in the fourth separated control loop. The conduits are used for connecting the different components and the valves are used for controlling the different operational modes of the system.

According to an aspect of the disclosure, the first circulation pump is arranged in the sixth conduit and the second circulation pump is arranged in the twelfth conduit. The circulation pumps are used for efficiently distributing the heat transfer fluid.

According to another aspect of the disclosure, the system further comprises a fourth valve controllable into a first valve position and a second valve position; where in the separated modes for cooling and/or heating the first unit and/or the second unit, the first unit and the second unit are fully separated from each other via the first valve, the second valve, the third valve, and the fourth valve. In the first separated mode, the second separated thermal control loop comprises the radiator connected to the fourth valve via the tenth conduit, the fourth valve connected to the second unit via the eleventh conduit and the twelfth conduit. In the second separated mode, the third separated thermal control loop comprises the radiator connected to the fourth valve via the tenth conduit, the fourth valve connected to the first unit via the fourteenth conduit and the sixth conduit. The fourth valve is assuring that the first unit and second unit are fully separated from each other, wherein the system is designed so that the separated control loops can function independently from each other.

According to further aspects of the disclosure, the first unit is a battery temperature regulating unit, and the second unit is a power electronics temperature regulating unit.

According to an aspect of the disclosure, the system further comprises a control unit controlling each of the valves into the first valve position and the second valve position. The control unit is steering the valves into the different valve positions so that the system can be operated in the different operational modes.

According to an aspect of the disclosure, the valves are each a three-way valve having an inlet port, a first outlet port and a second outlet port, where each three-way valve is controllable into the first valve position and the second valve position. Three-way valves are suitable for this specific application, since they are simple and reliable in construction and provide efficient ways of controlling the system.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
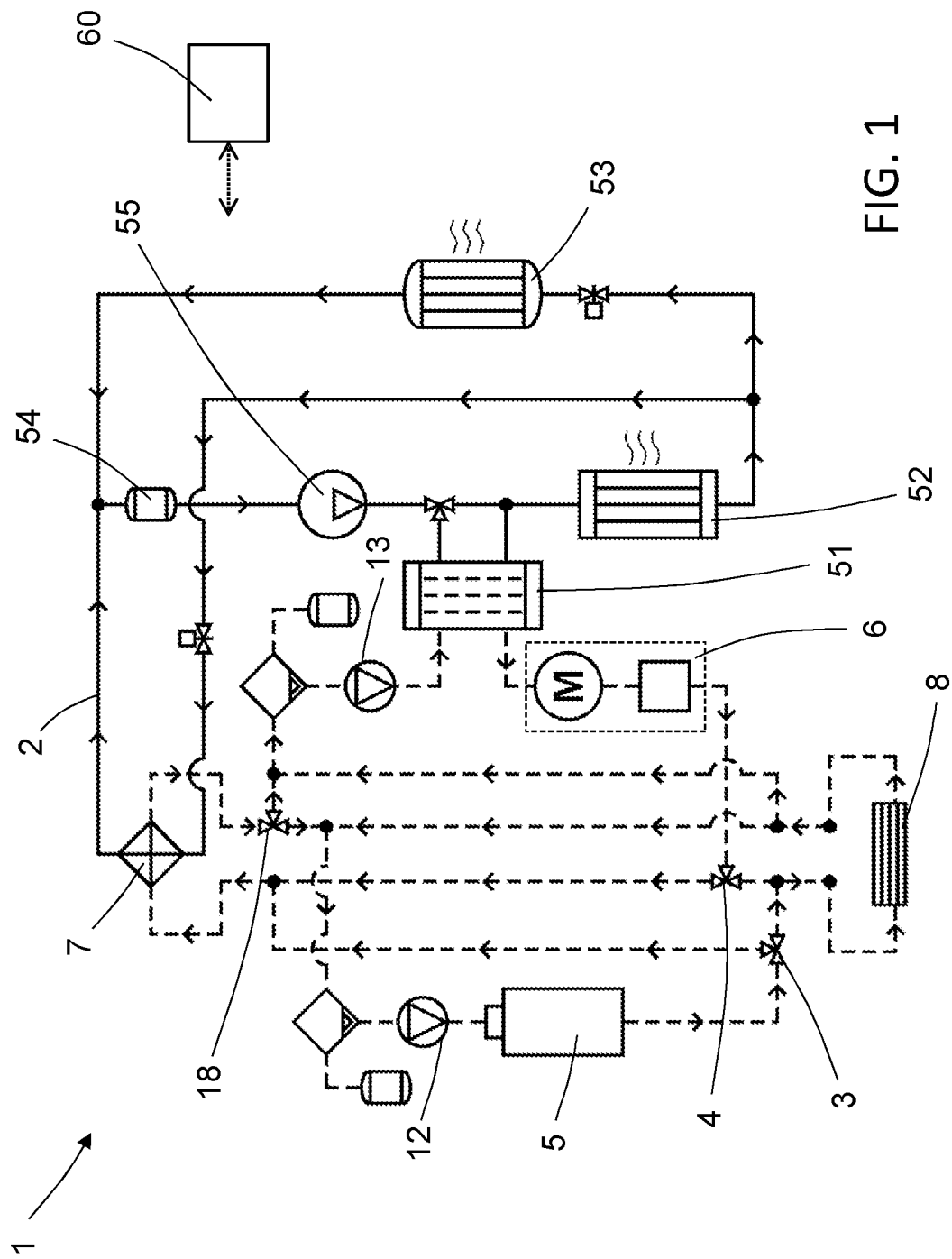
FIG. 1 shows schematically, a vehicle thermal management system in a three valve configuration according to the disclosure.

FIG. 1 schematically shows a schematic structure of a vehicle thermal management system 1 according to the disclosure, where the vehicle thermal management system 1 is used in a vehicle for controlling the temperature ranges of different vehicle units and also a passenger compartment or similar structure of the vehicle (referred to as thermally managed assemblies). In the embodiment shown in FIG. 1, the vehicle thermal management system has a three valve configuration. A first part of the vehicle thermal management system is used for controlling the temperature ranges of vehicle units with a heat transfer fluid that is circulated in different loops depending on the driving conditions of the vehicle and the variations in ambient temperature. The first part of the system is in FIG. 1 illustrated with dashed lines. The vehicle thermal management system 1 further comprises a second part in the form of a refrigerant system 2, where a refrigerant is used for cooling the cabin or similar structure of the vehicle. The second part of the system is in FIG. 1 illustrated with solid lines. The refrigerant system 2 may be of any conventional type used for vehicle purposes, and will not be described in detail.

As a non-limiting example, the refrigerant system 2 may have the configuration and design shown in FIG. 1, where the refrigerant system 2 comprises a first condenser 51 arranged to optionally interact with one of the heat transfer fluid loops of the vehicle thermal management system 1 and for cooling the refrigerant if desired; a second condenser 52 arranged for cooling and condensing the refrigerant, where the second condenser 52 may be used for heating the cabin of the vehicle; an evaporator 53 arranged for heating and evaporating the refrigerant, where the evaporator 53 may be used for cooling the cabin of the vehicle; an accumulator tank 54 arranged for storing the refrigerant; and a compressor 55 arranged for compressing the refrigerant. The different components of the refrigerant system are connected by pipes, hoses and other conventional connection means or couplings suitable for holding and transporting the refrigerant. Other configurations and designs of the refrigerant system 2 may be used instead.

The vehicle thermal management system according to the disclosure is designed and constructed in a way so that the system is adapted for being operated in different operational modes, where the heat transfer fluid is circulated to the vehicle units in an efficient way, as will be further described below. The system shown in FIG. 1 comprises a first unit 5 and a second unit 6 belonging to the first part of the system for controlling the temperature ranges of the vehicle units. As an example, the first unit 5 (e.g., a first thermally managed assembly) may be a battery temperature regulating unit and the second unit 6 (e.g., a second thermally managed assembly) may be a power electronics temperature regulating unit. The battery temperature regulating unit may for example be used for controlling the temperatures of one or more batteries used in the vehicle system. The power electronics temperature regulating unit may for example be used for controlling the temperatures of the power electronic components, such as the electric motor and the electric components being part of the power electronic system. It should however be understood that the system may be used for heating or cooling other types of vehicle units depending on the design and construction of the vehicle and the vehicle systems.

As shown in FIG. 1, the first condenser 51 is arranged before the second unit 6. As an alternative, the first condenser 51 may instead be arranged after the second unit 6 if desired depending on the design and construction of the system.

As described above, the vehicle thermal management system 1 comprises the first unit 5 and the second unit 6 in the first part of the system, and the refrigerant system 2 constitutes the second part of the system. The different components of the first part of the thermal management system 1 for controlling the temperature ranges of vehicle units will be further described in the following text, and the different components used in the system are connected by suitable conduits, such as hoses, pipes and other connection members or couplings commonly used in vehicle thermal management systems 1 for holding and transporting the heat transfer fluid. The first part of the vehicle thermal management system 1 further comprises, as shown in FIG. 1, a first valve 3, a second valve 4, a third valve 18, a chiller 7, and a radiator 8. The chiller 7 is connected to the refrigerant system 2 so that heat can be transferred between the first part of the system and the refrigerant system 2. The chiller 7 may be of any suitable conventional type suitable for automotive systems. Also the radiator 8 may be of any suitable conventional type suitable for automotive systems. The chiller 7 and the radiator 8 respectively are arranged for cooling and/or heating the first unit 5 and/or the second unit 6, wherein the heat transfer fluid is used as transferring medium between the chiller 7 and the respective vehicle units 5, 6, and the radiator 8 and the respective vehicle units 5, 6.

Different operational modes of the system with the three valve configuration shown in FIG. 1 will be further described in relation to FIGS. 2A-2B, 3A-3B and 4A-4B. In FIGS. 2A-2B and 3A-3B separated modes of the vehicle thermal management system 1 for cooling and/or heating the first unit 5 and/or the second unit 6 is schematically shown, and in FIGS. 4A-4B a connected mode for cooling or heating the first unit 5 and the second unit 6 of the vehicle thermal management system 1 is schematically shown. The different operational modes are providing a highly flexible system with different configurations for heating or cooling the vehicle units 5, 6. The vehicle thermal management system 1 can be made more efficient and flexible compared to traditional systems used, and the system can depending on driving conditions, ambient temperature and type of vehicle be connected or separated in the different operational modes. Further, the system can be designed and constructed with few components. The first valve 3, the second valve 4, and the third valve 18 are used for controlling the system. The valves can be controlled in different valve positions, and depending on the valve positions the different operational modes are established.

Figure 6A:
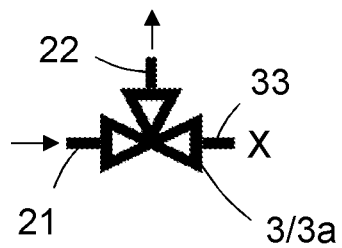
FIG. 6A-6D show schematically, different valve positions for valves in a vehicle thermal management system according to the disclosure.
Figure 6A:
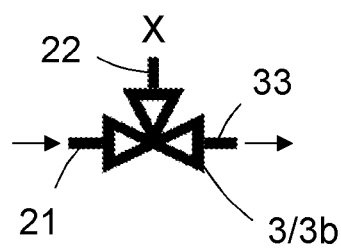
Figure 6B:
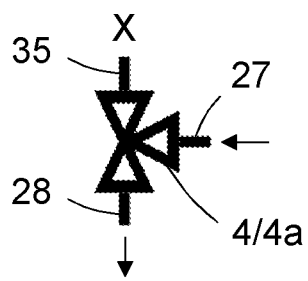
Figure 6B:
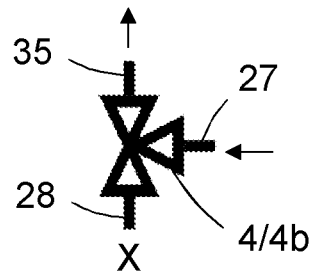
Figure 6C:
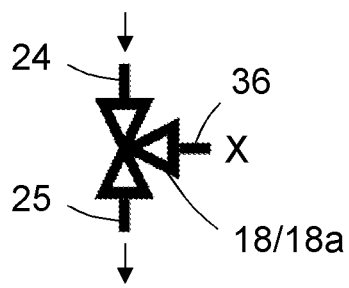
Figure 6C:
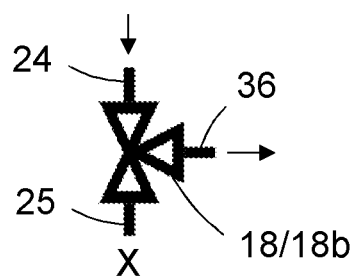
Figure 6D:
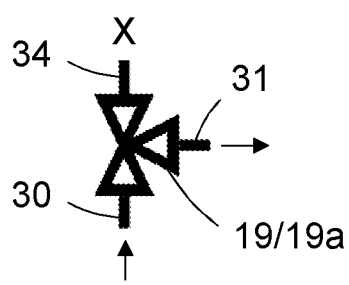
Figure 6D:
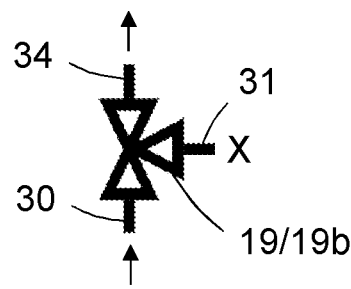

In the separated modes for cooling and/or heating the first unit 5 and/or the second unit 6, the first unit 5 and the second unit 6 are separated from each other via the first valve 3, the second valve 4 and the third valve 18. In the connected mode, the first unit 5 and the second unit 6 are connected to each other via the first valve 3, the second valve 4, and the third valve 18. Each of the first valve 3, the second valve 4 and the third valve 18 is controllable into a first valve position 3a, 4a, 18a and a second valve position 3b, 4b, 18b. Depending on the valve positions the connected or separated thermal control loops are formed. The first valve 3 can thus be controlled in a first valve position 3a and a second valve position 3b. The second valve 4 can be controlled in a first valve position 4a and a second valve position 4b, and the third valve 18 can be controlled in a first valve position 18a and a second valve position 18b. The different valve positions of the first valve 3, the second valve 4, and the third valve 18 will be further described below in relation to FIGS. 6A-6C. The system may further comprise a control unit 60 controlling each of the valves into the first valve position and the second valve position. The control unit 60 may be of any suitable type for controlling and directing the system and the system components, and may for example include a central processing unit with connected sensors, input control devices, and output control devices.

As shown in FIG. 1, the vehicle thermal management system 1 further comprises a first circulation pump 12 and a second circulation pump 13, which are used for circulating the heat transfer fluid in the connected or separated thermal control loops. The circulation pumps may be of any conventional type suitable for circulating heat transfer fluid in vehicle thermal systems, and may be of different types and configuration depending on the size and design of the system.

Figure 2A:
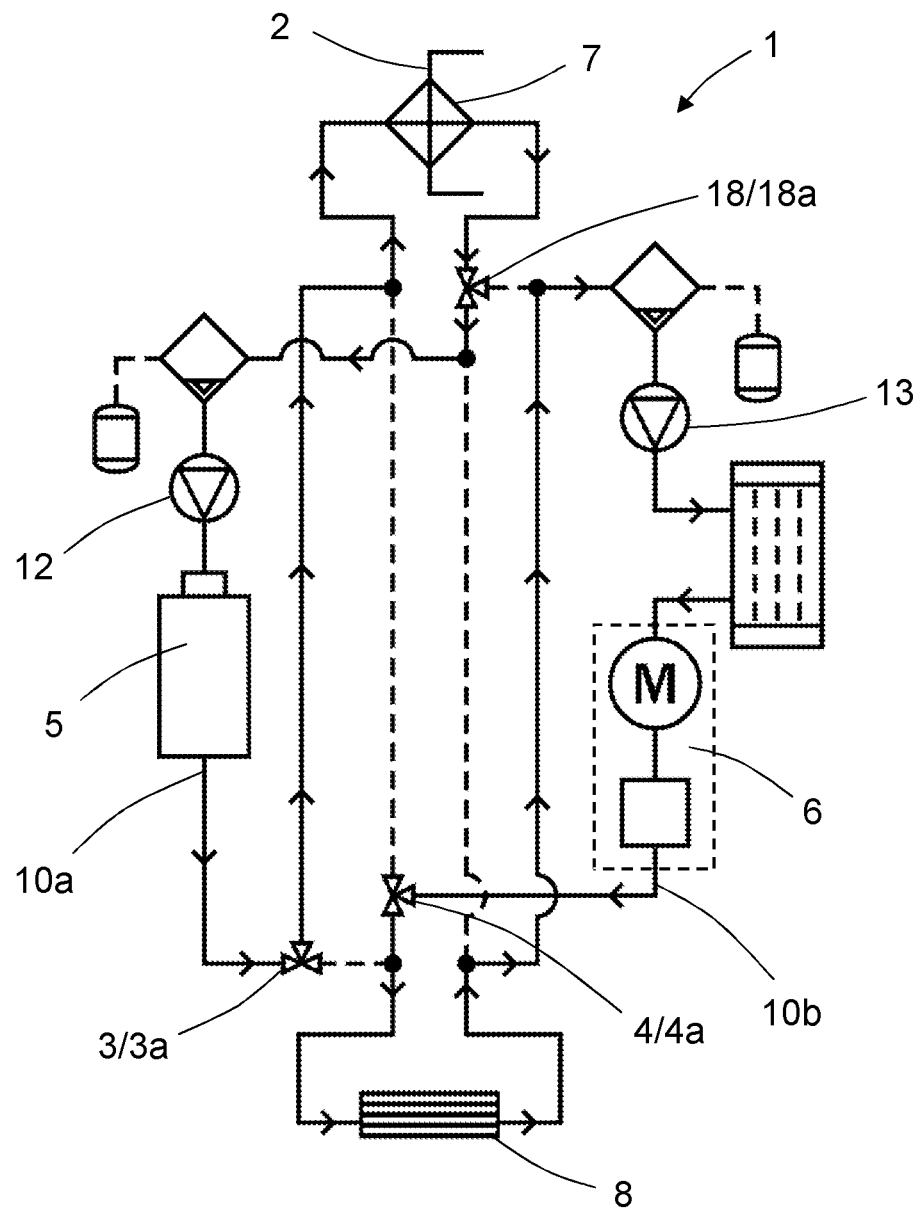
FIG. 2A-2B show schematically, a vehicle thermal management system in a three valve configuration in a first separated mode according to the disclosure.
Figure 2B:
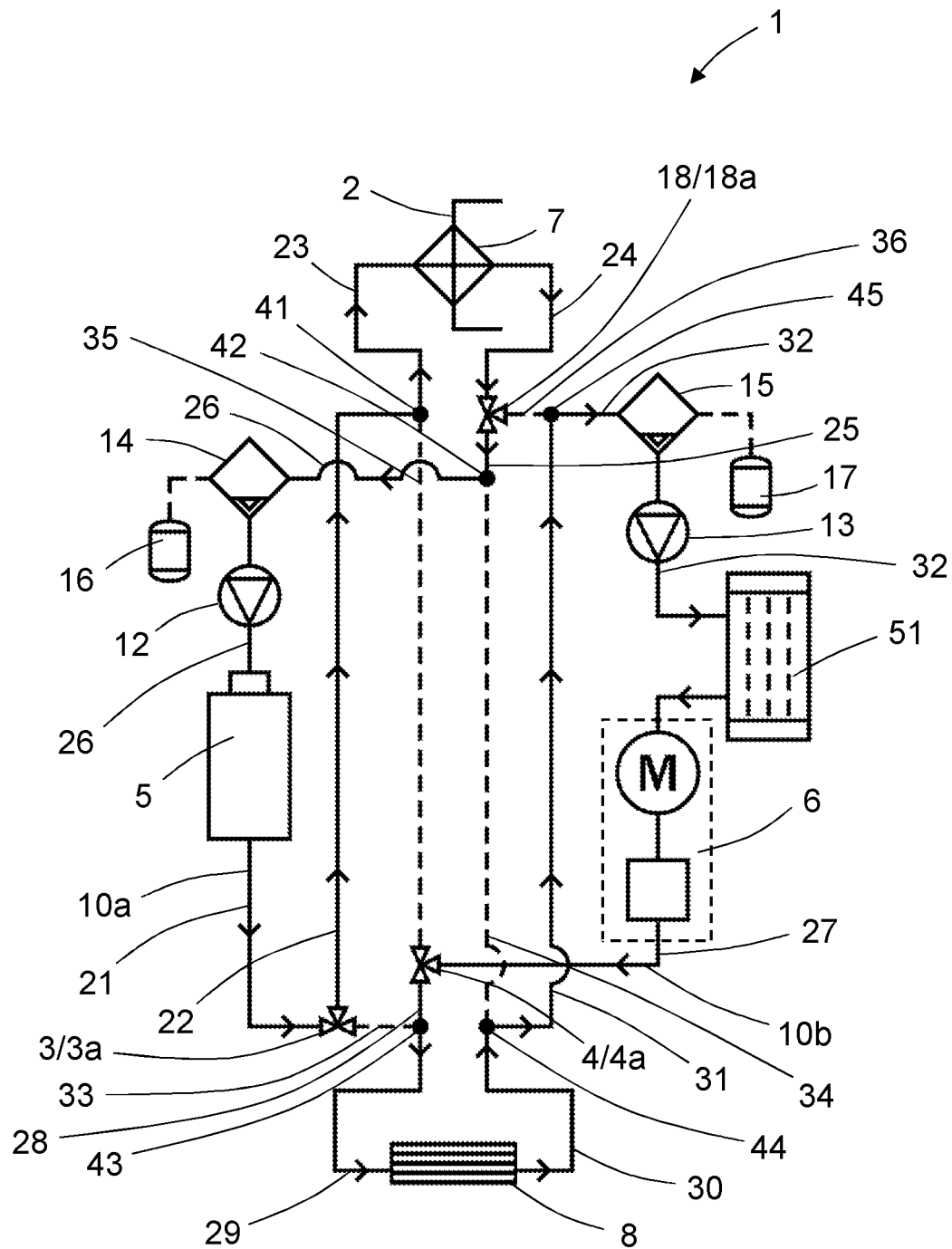

In FIGS. 2A-2B, a first separated mode of the vehicle thermal management system in the three valve configuration according to the embodiment in FIG. 1 is schematically shown. In the first separated mode, the first unit 5 is connected to the chiller 7 in a first separated thermal control loop 10a, and the second unit 6 is connected to the radiator 8 in a second separated thermal control loop 10b. In FIGS. 2A-2B only the first part of the vehicle thermal management system 1 is illustrated.

Through the configuration of the vehicle thermal management system, the system can be designed so that in the first separated mode, the first separated thermal control loop 10a and the second separated thermal control loop 10b may have different temperature ranges. This gives a high flexibility to the system in the first separated mode so that the first unit 5 and the second unit 6 respectively can be operated at different temperature ranges. As an example, the first unit 5 can be operated at one specific temperature range through the connection to the chiller 7, and the second unit 6 can be operated at the same or another temperature range through the connection to the radiator 8.

As shown in FIGS. 2A-2B, in the first separated mode the heat transfer fluid is circulated in the first separated thermal control loop 10a by the first circulation pump 12, and the heat transfer fluid is circulated in the second separated thermal control loop 10b by the second circulation pump 13. Through this arrangement, the first circulation pump 12 can be operated with a different flow output compared to the second circulation pump 13 if desired. Thus, the heat transfer fluid may be circulated in the first separated thermal control loop 10a with a different flow rate than the heat transfer fluid in the second separated thermal control loop 10b.

In order to configure the system into the first separated mode, the first valve 3 is positioned in the first valve position 3a, the second valve 4 is positioned in the first valve position 4a, and the third valve 18 is positioned in the first valve position 18a, as illustrated in FIGS. 2A-2B and 6A-6C. The controlling of the valves into the desired positions may for example be achieved through a suitable valve control system connected to the control unit 60. Once it is desired that the system should operate in the first separated mode, the control unit 60 sends an output signal to the respective valves for controlling the valves into the desired positions. The valve control system may be of any conventional type suitable for controlling and operating valves.

In the first separated mode, the first separated thermal control loop 10a and the second separated thermal control loop 10b comprise different components that are forming the respective loops, and in FIGS. 2A-2B, the loops are indicated with solid lines. In the first separated thermal control loop 10a, as shown in FIG. 2B, the first unit 5 is connected to the first valve 3 via a first conduit 21. The first valve 3 is connected to the chiller 7 via a second conduit 22 and a third conduit 23. As shown in the figure, the second conduit 22 and the third conduit 23 are connected to each other through a first connection point 41. The chiller 7 is connected to the third valve 18 via a fourth conduit 24. The third valve 18 is connected to the first unit 5 via a fifth conduit 25 and a sixth conduit 26. The fifth conduit 25 and the sixth conduit 26 are connected to each other through a second connection point 42. In the sixth conduit 26, a first separator 14 connected to a first separation tank 16 may be arranged if desired. The first circulation pump 12 may be arranged in the sixth conduit 26. However, the first circulation pump 12 may be arranged in other parts of the loop if desired. In the second separated thermal control loop 10b, the second unit 6 is connected to the second valve 4 via a seventh conduit 27. The second valve 4 is connected to the radiator 8 via an eighth conduit 28 and a ninth conduit 29. As shown in FIG. 2B, the eighth conduit 28 and the ninth conduit 29 are connected to each other through a third connection point 43. The radiator 8 is connected to the second unit 6 via a tenth conduit 30, an eleventh conduit 31 and a twelfth conduit 32. The tenth conduit 30 and the eleventh conduit 31 are connected to each other through a fourth connection point 44, and the eleventh conduit 31 and the twelfth conduit 32 are connected to each other through a fifth connection point 45. In the twelfth conduit 32, a second separator 15 connected to a second separation tank 17 may be arranged if desired. The second circulation pump 13 may be arranged in the twelfth conduit 32. However, the second circulation pump 13 may be arranged in other parts of the loop if desired. Also, the first condenser 51 is arranged in the twelfth conduit, as shown in FIGS. 2A-2B. As an alternative, the system may instead be designed so that only one separator and one separation tank are used, and in this way the different loops may share the same separator and separation tank.

In the first separated mode, the first separated thermal control loop 10a and the second separated thermal control loop 10b are formed through the different components described above. The respective circulation pumps 12, 13 are used for circulating the heat transfer fluid in the loops, and the flow direction is indicated with arrows in FIGS. 2A-2B. In the first thermal control loop 10a the chiller 7 is used for controlling the temperature of the first unit 5, and in the second thermal control loop 10b the radiator 8 is used for controlling the temperature of the second unit 6.

As described above, the connection points used in the system are having a three-way configuration, and therefore in theory there might be a possibility for heat transfer fluid to flow between the first separated thermal control loop 10a and the second separated thermal control loop 10b. As shown in FIG. 2B, the second connection point 42 is connected to the fourth connection point 44 via a fourteenth conduit 34, and there is thus a theoretical possibility for the heat transfer fluid to flow in the fourteenth conduit 34 between the loops. However in practice, the flow in the respective loops are stabilized once the valves are positioned in the desired valve positions and therefore no or only a minor flow of heat transfer fluid is being transferred between the loops. When changing the valve positions there might be a flow between the loops during a few seconds before the loops are being stabilized. However, this will not affect the functionality of the system.

Figure 3A:
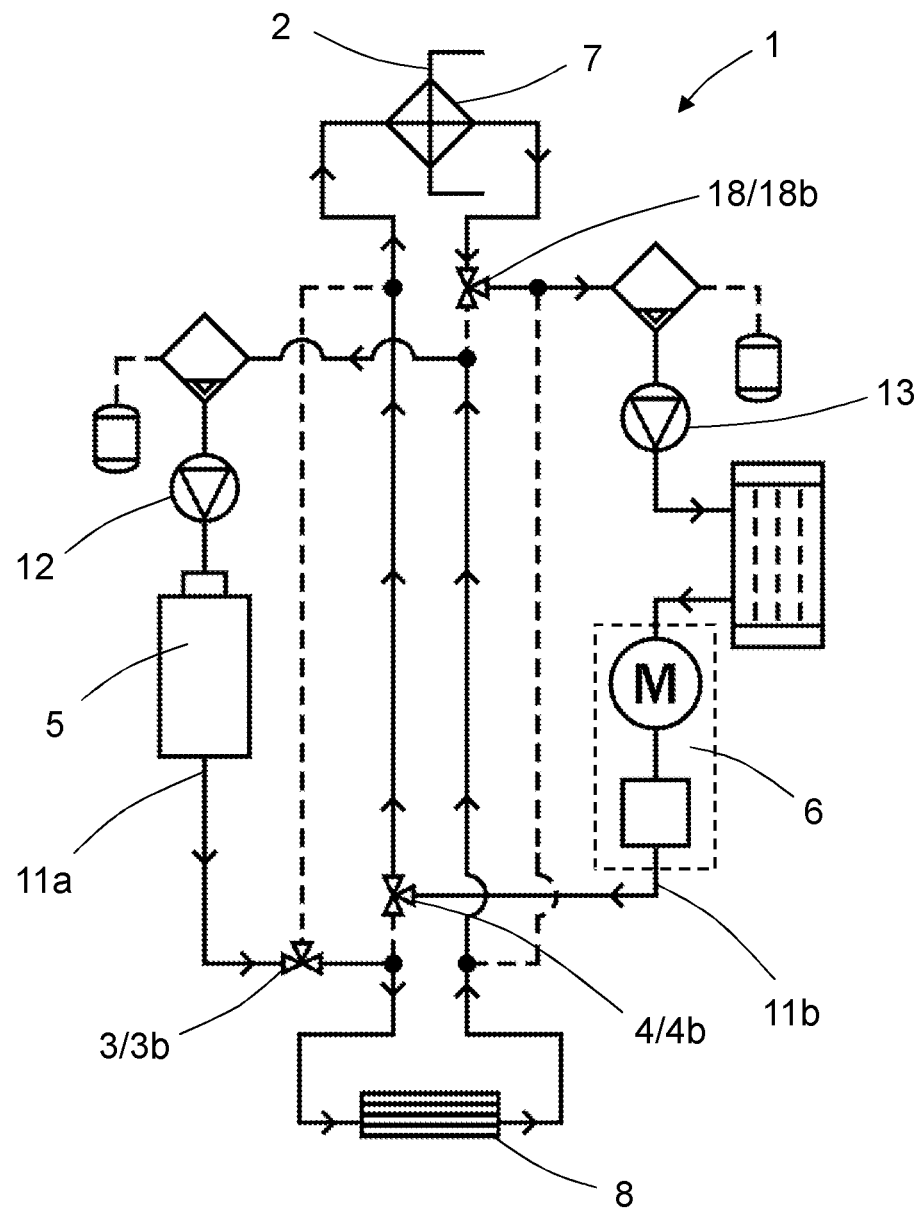
FIG. 3A-3B show schematically, a vehicle thermal management system in a three valve configuration in a second separated mode according to the disclosure.
Figure 3B:
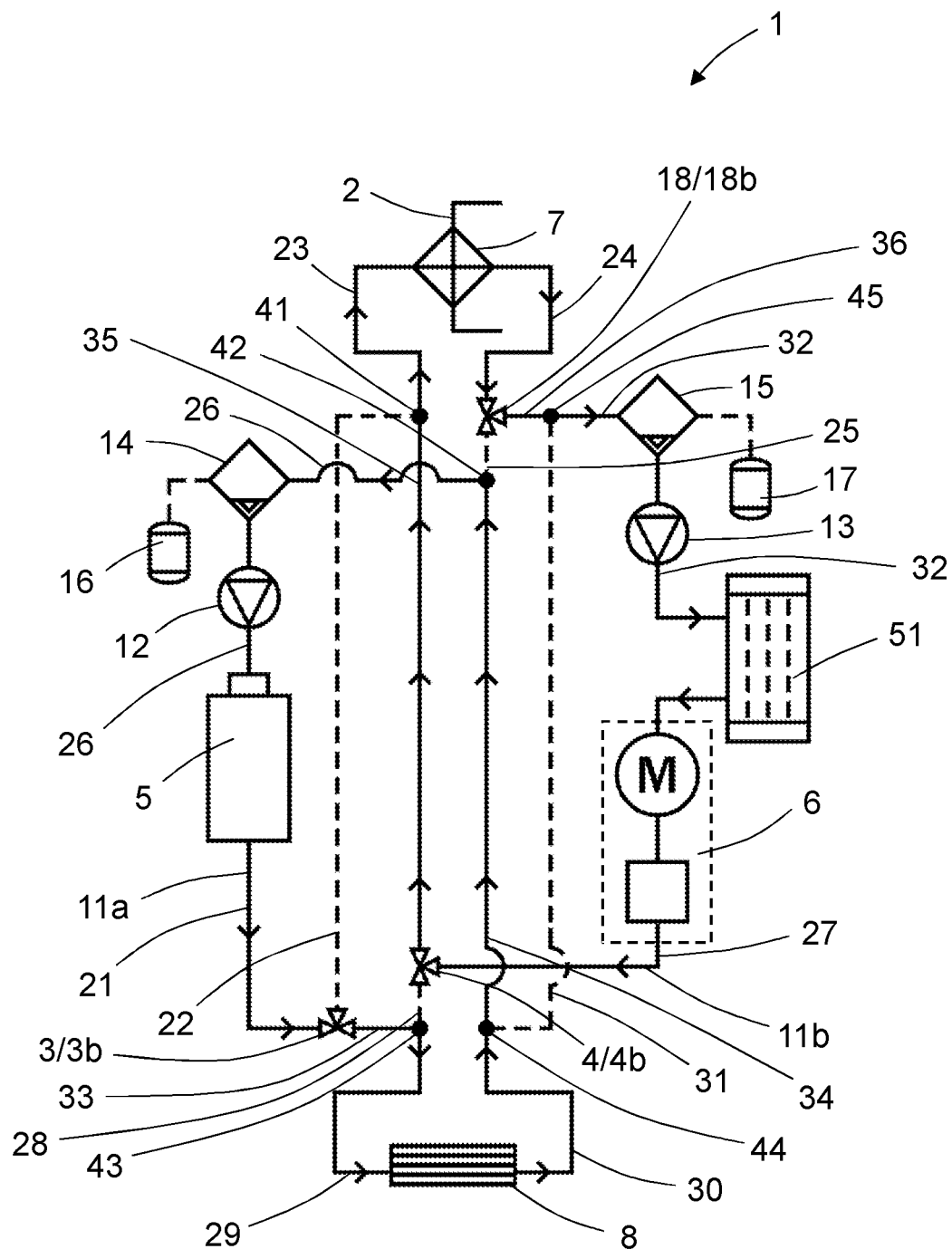

In FIGS. 3A-3B, a second separated mode of the vehicle thermal management system in the three valve configuration according to the embodiment in FIG. 1 is schematically shown. In the second separated mode, the first unit 5 is connected to the radiator 8 in a third separated thermal control loop 11a, and the second unit 6 is connectable to the chiller 7 in a fourth separated thermal control loop 11b. In FIGS. 3A-3B only the first part of the vehicle thermal management system 1 is illustrated.

Through the configuration of the vehicle thermal management system, the system can be designed so that in in the second separated mode, the third separated thermal control loop 11a and the fourth separated thermal control loop 11b may have different temperature ranges. This gives a high flexibility to the system in the second separated mode so that the first unit 5 and the second unit 6 respectively can be operated at different temperature ranges. As an example, the first unit 5 can be operated at one specific temperature range through the connection to the radiator 8, and the second unit 6 can be operated at the same or another temperature range through the connection to the chiller 7.

As shown in FIGS. 3A-3B, in the second separated mode the heat transfer fluid is circulated in the third separated thermal control loop 11a by the first circulation pump 12, and the heat transfer fluid is circulated in the fourth separated thermal control loop 11b by the second circulation pump 13. Through this arrangement, the first circulation pump 12 can be operated with a different flow output compared to the second circulation pump 13 if desired. Thus, the heat transfer fluid may be circulated in the third separated thermal control loop 11a with a different flow rate than the heat transfer fluid in the fourth separated thermal control loop 11b.

In order to configure the system into the second separated mode, the first valve 3 is positioned in the second valve position 3b, the second valve 4 is positioned in the second valve position 4b, and the third valve 18 is positioned in the second valve position 18b, as illustrated in FIGS. 3A-3B and 6A-6C. The controlling of the valves into the desired positions may, in the same way as in the first separated mode, for example be achieved through the valve control system connected to the control unit 60. Once it is desired that the system should operate in the second separated mode, the control unit 60 sends an output signal to the respective valves for controlling the valves into the desired positions.

In the second separated mode, the third separated thermal control loop 11a and the fourth separated thermal control loop 11b comprise different components that are forming the respective loops, and in FIGS. 3A-3B, the loops are indicated with solid lines. In the third separated thermal control loop 11a, as shown in FIG. 3B, the first unit 5 is connected to the first valve 3 via the first conduit 21. The first valve 3 is connected to the radiator 8 via a thirteenth conduit 33 and the ninth conduit 29. As shown in the figure, the thirteenth conduit 33 and the ninth conduit 29 are connected to each other through the third connection point 43. The radiator 8 is connected to the first unit 5 via the tenth conduit 30, the fourteenth conduit 34 and the sixth conduit 26. The tenth conduit 30 and the fourteenth conduit 34 are connected to each other through the fourth connection point 44, and the fourteenth conduit 34 and the sixth conduit 26 are connected to each other through the second connection point 42. In the sixth conduit 26, the first separator 14 connected to the first separation tank 16 may be arranged if desired. The first circulation pump 12 may be arranged in the sixth conduit 26. However, the first circulation pump 12 may be arranged in other parts of the loop if desired. In the fourth separated thermal control loop 11b, the second unit 6 is connected to the second valve 4 via the seventh conduit 27. The second valve 4 is connected to the chiller 7 via a fifteenth conduit 35 and the third conduit 23. As shown in FIG. 3B, the fifteenth conduit 35 and the third conduit 23 are connected to each other through the first connection point 41. The chiller 7 is connected to the third valve 18 via the fourth conduit 24. The third valve 18 is connected to the second unit 6 via a sixteenth conduit 36 and the twelfth conduit 32. The sixteenth conduit 36 and the twelfth conduit 32 are connected to each other through the fifth connection point 45. In the twelfth conduit 32, the second separator 15 connected to the second separation tank 17 may be arranged if desired. The second circulation pump 13 may be arranged in the twelfth conduit 32. However, the second circulation pump 13 may be arranged in other parts of the loop if desired. Also, the first condenser 51 is arranged in the twelfth conduit, as shown in FIGS. 3A-3B. As an alternative, the system may as described above instead be designed so that only one separator and one separation tank are used, and in this way the different loops may share the same separator and separation tank.

In the second separated mode, the third separated thermal control loop 11a and the fourth separated thermal control loop 11b are formed through the different components described above. The respective circulation pumps 12, 13 are used for circulating the heat transfer fluid in the loops, and the flow direction is indicated with arrows in FIGS. 3A-3B. In the third thermal control loop 11a the radiator 8 is used for controlling the temperature of the first unit 5, and in the fourth thermal control loop 11b the chiller 7 is used for controlling the temperature of the second unit 6.

As described above, the connection points used in the system are having a three-way configuration, and therefore in theory there might be a possibility for heat transfer fluid to flow between the third separated thermal control loop 11a and the fourth separated thermal control loop 11b. As shown in FIG. 3B, the fourth connection point 44 is connected to the fifth connection point 45 via the eleventh conduit 31, and there is thus a theoretical possibility for the heat transfer fluid to flow in the eleventh conduit 31 between the loops. However in practice, the flow in the respective loops are stabilized once the valves are positioned in the desired valve positions and therefore no or only a minor flow of heat transfer fluid is being transferred between the loops. When changing the valve positions there might be a flow between the loops during a few seconds before the loops are being stabilized. However, this will not affect the functionality of the system.

Figure 4A:
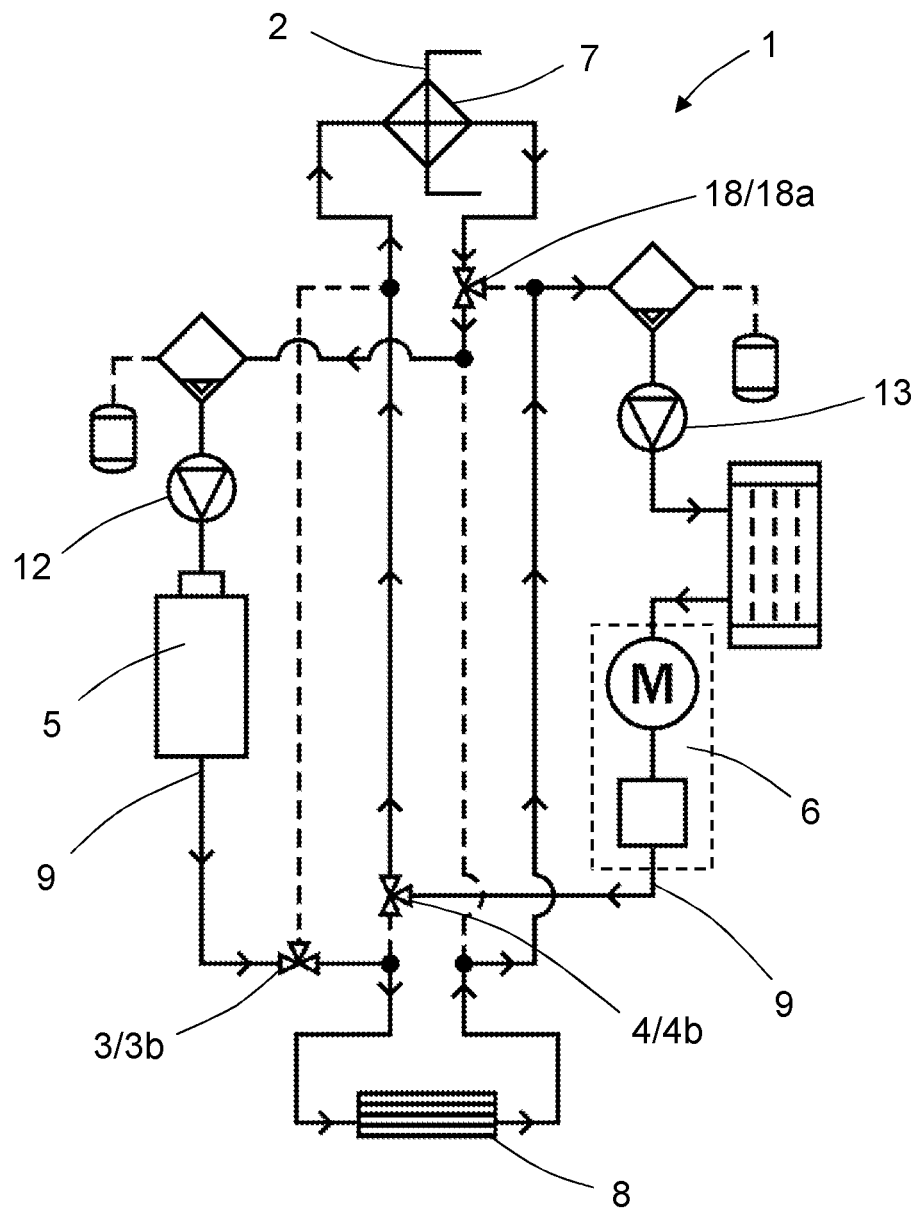
FIG. 4A-4B show schematically, a vehicle thermal management system in a three valve configuration in a connected mode according to the disclosure.
Figure 4B:
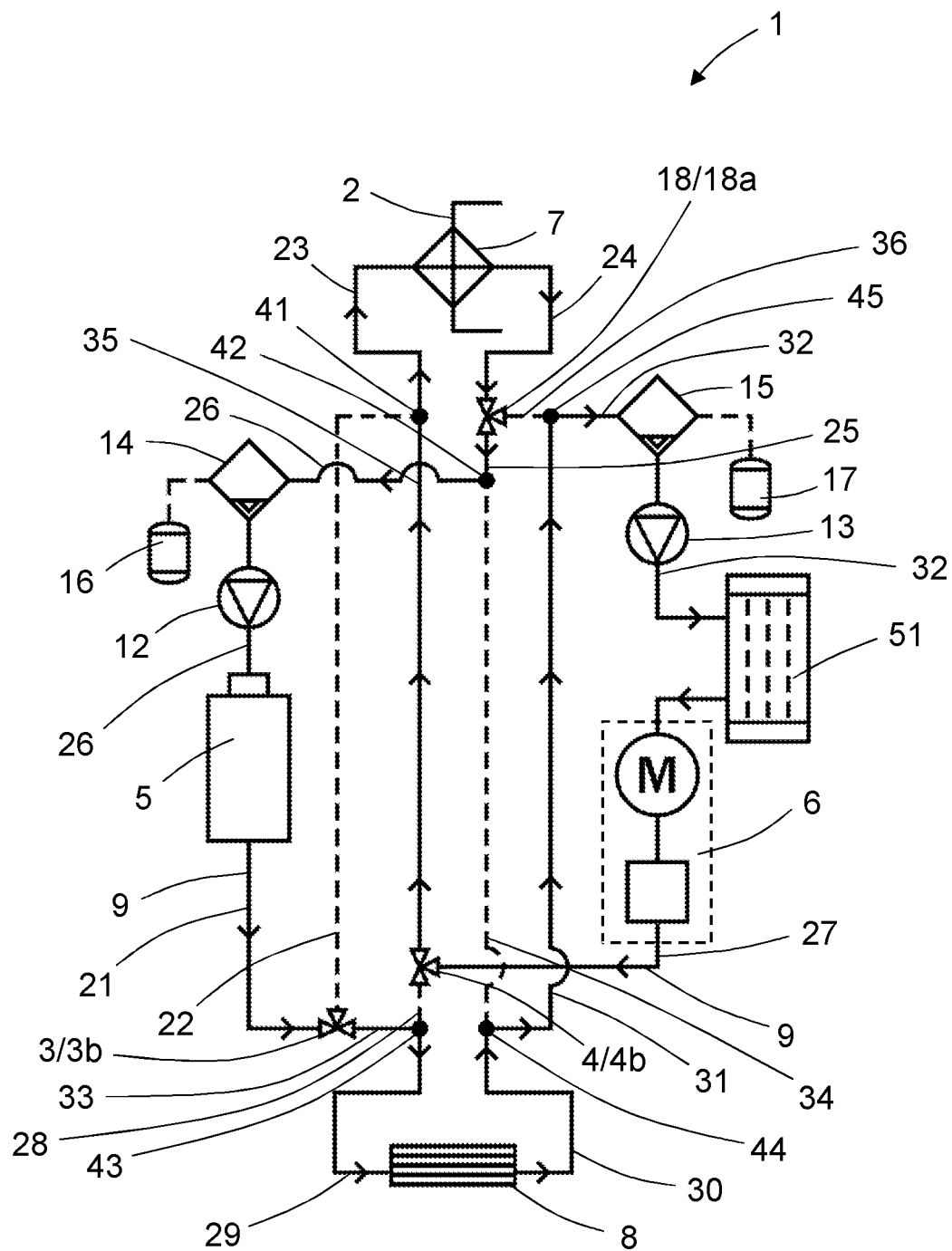

In FIGS. 4A-4B, one example of the connected mode of the vehicle thermal management system in the three valve configuration according to the embodiment in FIG. 1 is schematically shown, where the connected mode is used for cooling or heating the first unit 5 and the second unit 6. In the connected mode, the connected thermal control loop 9 comprises different components that are forming the loop, and in FIGS. 4A-4B, the loop is indicated with solid lines. The first unit 5 and the second unit 6 are in the embodiment shown in FIGS. 4A-4B connected both to the chiller 7 and the radiator 8 in a connected thermal control loop 9. In FIGS. 4A-4B only the first part of the vehicle thermal management system 1 is illustrated. It should however be understood that, depending on the system design and configuration, the first unit 5 and the second unit 6 may be connected both to the chiller 7 and the radiator 8 in a different way than in the configuration shown in FIGS. 4A-4B.

In the connected thermal control loop 9 the heat transfer fluid is circulated by the first circulation pump 12 and/or the second circulation pump 13. Depending on the design of the system and the type of pumps used, both circulation pumps can be used for circulating the heat transfer fluid. As an alternative, one of the circulation pumps may be used instead.

In order to configure the system into the connected mode according to the embodiment shown in FIGS. 4A-4B, the first valve 3 is positioned in the second valve position 3b, the second valve 4 is positioned in the second valve position 4b, and the third valve 18 is positioned in the first valve position 18a, as illustrated in FIGS. 4A-4B and 6A-6C. The controlling of the valves into the desired positions may as described above for example be achieved through a suitable valve control system connected to the control unit 60. Once it is desired that the system should operate in the connected mode, the control unit 60 sends an output signal to the respective valves for controlling the valves into the desired positions. The valve control system may be of any conventional type suitable for controlling and operating valves.

In the connected thermal control loop 9, as shown in FIG. 4B, the first unit 5 is connected to the first valve 3 via the first conduit 21. The first valve 3 is connected to the radiator 8 via the thirteenth conduit 33 and the ninth conduit 29. The radiator 8 is connected to the second unit 6 via the tenth conduit 30, the eleventh conduit 31 and the twelfth conduit 32. In the twelfth conduit 32, the second separator 15 connected to the second separation tank 17 may be arranged if desired. The second circulation pump 13 may be arranged in the twelfth conduit 32. However, the second circulation pump 13 may be arranged in other parts of the loop if desired. Also, the first condenser 51 is arranged in the twelfth conduit, as shown in FIGS. 4A-4B. The second unit 6 is connected to the second valve 4 via the seventh conduit 27. The second valve 4 is connected to the chiller 7 via the fifteenth conduit 35 and the third conduit 23. The chiller 7 is connected to the third valve 18 via the fourth conduit 24. The third valve 18 is connected to the first unit 5 via the fifth conduit 25 and the sixth conduit 26. In the sixth conduit 26, the first separator 14 is connected to the first separation tank 16 may be arranged if desired. The first circulation pump 12 may be arranged in the sixth conduit 26. However, the first circulation pump 12 may be arranged in other parts of the loop if desired. The conduits are where needed connected to each other with different connection points in the same way as for the embodiments described above in relation to FIGS. 2A-2B and 3A-3B. As an alternative, the system may as described above instead be designed so that only one separator and one separation tank are used, and in this way the different loops may share the same separator and separation tank.

In the connected mode, the connected thermal control loop 9 is formed through the different components described above. The respective circulation pumps 12, 13 are used for circulating the heat transfer fluid in the loops, and the flow direction is indicated with arrows in FIGS. 4A-4B. In the connected thermal control loop 9, both the radiator 8 and the chiller 7 are used for controlling the temperatures of the first unit 5 and the second unit 6.

Figure 5A:
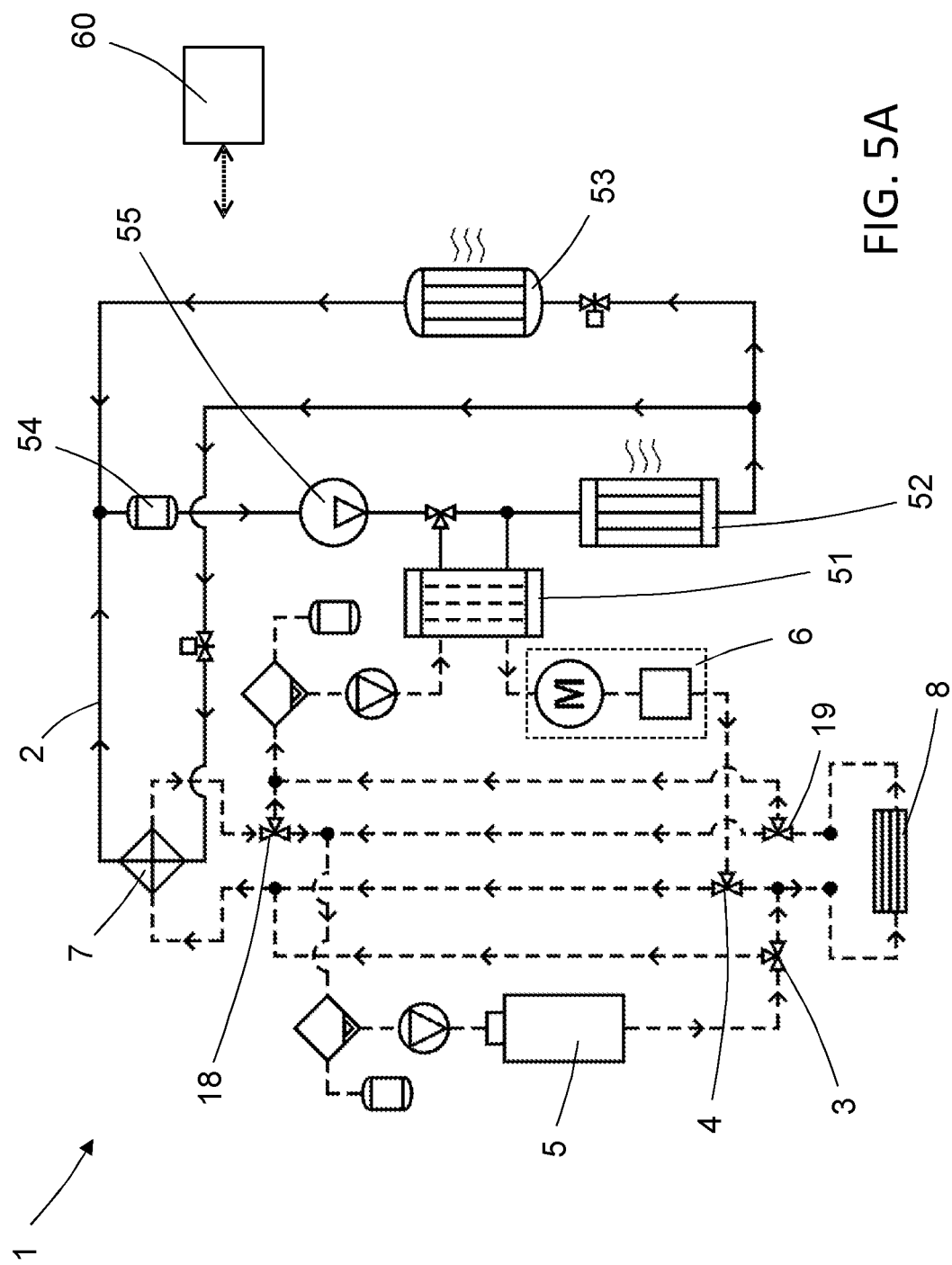
FIG. 5A-5D show schematically, different operational modes of a vehicle thermal management system in a four valve configuration according to the disclosure.

An alternative embodiment of the vehicle thermal management system 1 is shown in FIGS. 5A-5D. In this alternative embodiment, the vehicle thermal management system instead has a four valve configuration. This alternative configuration is used for securing that the separated control loops are fully separated from each other preventing that the heat transfer fluid can flow between the separated loops. FIG. 5A schematically shows a schematic structure of the vehicle thermal management system 1 according to the alternative system with the four valve configuration. The vehicle thermal management system 1 is used in a vehicle for controlling the temperature ranges of different vehicle units and also a passenger compartment or similar structure of the vehicle, in the same way as in the other embodiments described. As shown in FIG. 5A, the system further comprises a fourth valve 19 controllable into a first valve position 19a and a second valve position 19b. In this way, the system has four valves and compared to the system having a three valve configuration, the fourth valve 19 has replaced the fourth connection point 44. The layout of the system having a four valve configuration is thus identical to the system having the three valve configuration, with the same components involved with the exception that the fourth connection point 44 has been replaced with the fourth valve 19. The system with the four valve configuration has the same purpose and function as the system with a three valve configuration. Through this arrangement, the different modes are instead controlled by four valves. The control unit 60 is also in this embodiment used for controlling each of the valves into the first valve position and the second valve position, in the same way as described in relation to the other embodiments above.

Figure 5B:
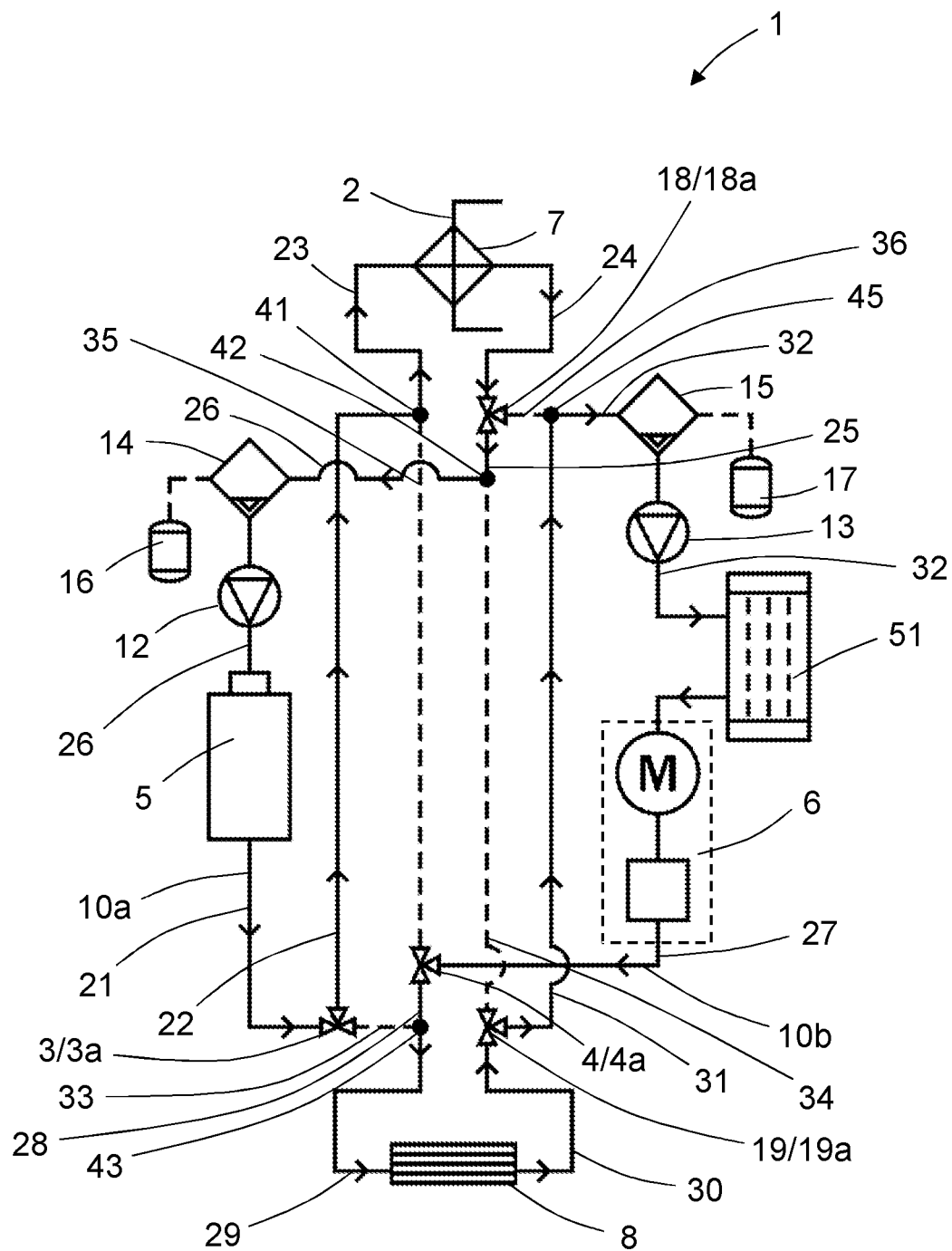
Figure 5C:
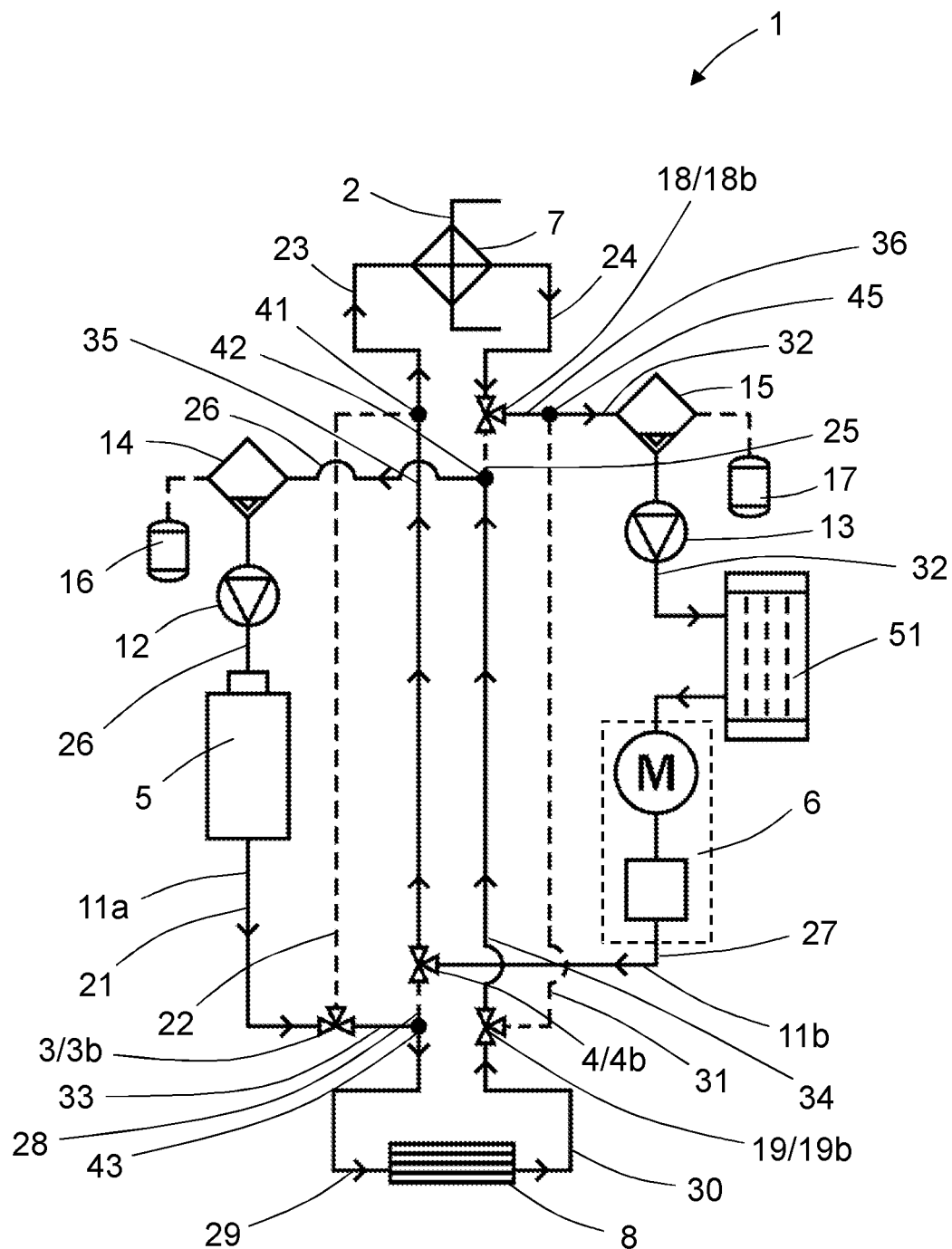
Figure 5D:
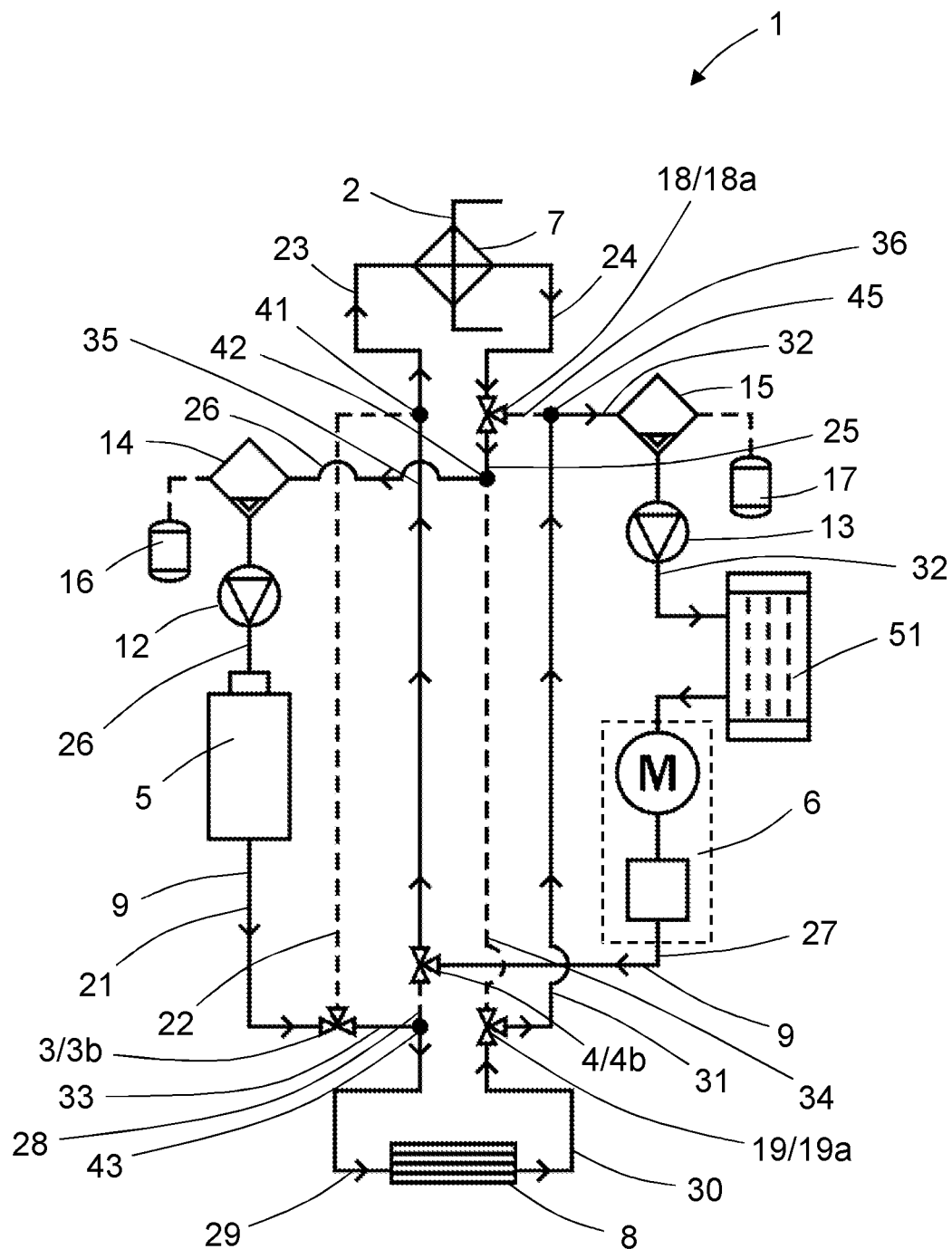

Different operational modes of the system with the four valve configuration shown in FIG. 5A will be further described in relation to FIGS. 5B-5D. In FIGS. 5B-5C separated modes of the vehicle thermal management system 1 for cooling and/or heating the first unit 5 and/or the second unit 6 is schematically shown, and in FIG. 5D a connected mode for cooling or heating the first unit 5 and the second unit 6 of the vehicle thermal management system 1 is schematically shown. The different operational modes are providing a highly flexible system with different configurations for heating or cooling the vehicle units 5, 6. The vehicle thermal management system 1 can be made more efficient and flexible compared to traditional systems used, and the system can depending on driving conditions, ambient temperature and type of vehicle be connected or separated in the different operational modes. Further, the system can be designed and constructed with few components. The first valve 3, the second valve 4, the third valve 18 and the fourth valve 19 are used for controlling the system. The valves can be controlled in different valve positions, and depending on the valve positions the different operational modes are established.

In the separated modes for cooling and/or heating the first unit 5 and/or the second unit 6, the first unit 5 and the second unit 6 are fully separated from each other via the first valve 3, the second valve 4, the third valve 18, and the fourth valve 19.

In order to configure the system into the first separated mode, as shown in FIG. 5B, the first valve 3 is positioned in the first valve position 3a, the second valve 4 is positioned in the first valve position 4a, the third valve 18 is positioned in the first valve position 18a, and the fourth valve 19 is positioned in the first valve position 19a as illustrated in FIGS. 5B and 6A-6D. The controlling of the valves into the desired positions may for example be achieved through a suitable valve control system connected to the control unit 60. Once it is desired that the system should operate in the first separated mode, the control unit 60 sends an output signal to the respective valves for controlling the valves into the desired positions. The valve control system may be of any conventional type suitable for controlling and operating valves. In the first separated mode, the first separated thermal control loop 10a and the second separated thermal control loop 10b comprise different components that are forming the respective loops, and in FIG. 5B, the loops are indicated with solid lines. In the first separated mode, as shown in FIG. 5B, the second separated thermal control loop 10b comprises the radiator 8 connected to the fourth valve 19 via the tenth conduit 30, and the fourth valve 19 is connected to the second unit 6 via the eleventh conduit 31 and the twelfth conduit 32.

In order to configure the system into the second separated mode, as shown in FIG. 5C, the first valve 3 is positioned in the second valve position 3b, the second valve 4 is positioned in the second valve position 4b, the third valve 18 is positioned in the second valve position 18b, and the fourth valve 19 is positioned in the second valve position 19b as illustrated in FIGS. 5C and 6A-6D. The controlling of the valves into the desired positions may for example be achieved through a suitable valve control system connected to the control unit 60. Once it is desired that the system should operate in the second separated mode, the control unit 60 sends an output signal to the respective valves for controlling the valves into the desired positions. The valve control system may be of any conventional type suitable for controlling and operating valves. In the second separated mode, the third separated thermal control loop 11a and the fourth separated thermal control loop 11b comprise different components that are forming the respective loops, and in FIG. 5C, the loops are indicated with solid lines. In the second separated mode, as shown in FIG. 5C, the third separated thermal control loop 11a comprises the radiator 8 connected to the fourth valve 19 via the tenth conduit 30, and the fourth valve 19 is connected to the first unit 5 via the fourteenth conduit 34 and the sixth conduit 26.

In order to configure the system into the connected mode, as shown in FIG. 5D, the first valve 3 is positioned in the second valve position 3b, the second valve 4 is positioned in the second valve position 4b, the third valve 18 is positioned in the first valve position 18a, and the fourth valve 19 is positioned in the first valve position 19a as illustrated in FIGS. 5D and 6A-6D. The controlling of the valves into the desired positions may for example be achieved through a suitable valve control system connected to the control unit 60. Once it is desired that the system should operate in the connected mode, the control unit 60 sends an output signal to the respective valves for controlling the valves into the desired positions. The valve control system may be of any conventional type suitable for controlling and operating valves. In the connected mode, the connected thermal control loop 9 comprises different components that are forming the loop, and in FIG. 5D the loop is indicated with solid lines. It should however be understood that, depending on the system design and configuration, the first unit 5 and the second unit 6 may be connected both to the chiller 7 and the radiator 8 in a different way than in the configuration shown in FIGS. 4A-4B.

Figure 7A:
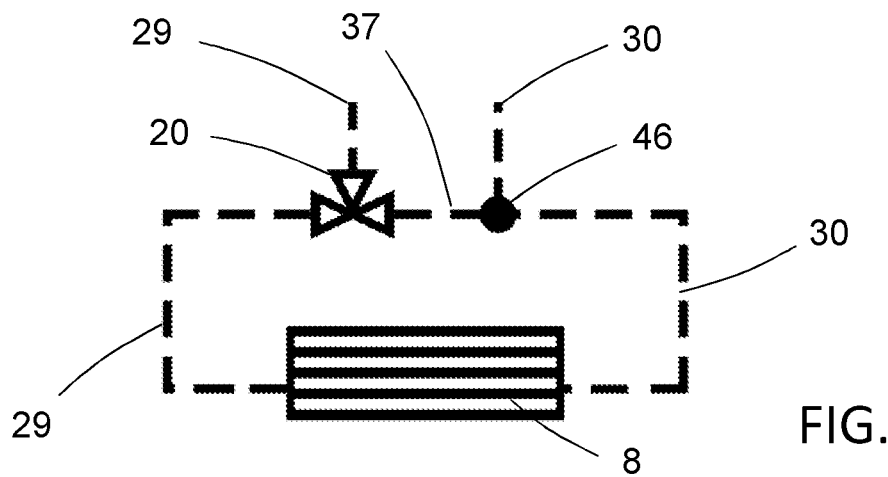
FIG. 7A-7C show schematically, different operational modes of a radiator by-pass configuration in an alternative embodiment of a vehicle thermal management system according to the disclosure.
Figure 7B:
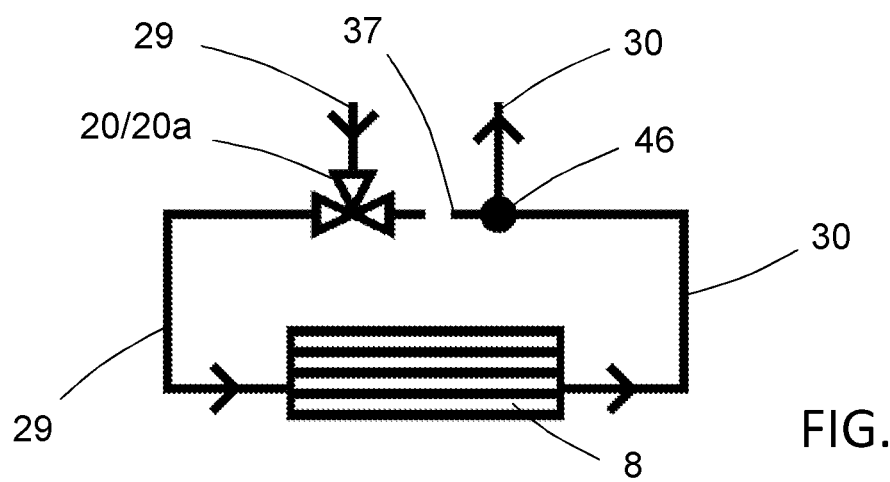

In an alternative embodiment of the vehicle thermal management system, the system may be configured so that only the chiller 7 is used in the separated or connected modes. In this alternative embodiment, the vehicle thermal management system 1 further comprises a by-pass valve 20, a sixth connection point 46 and a seventeenth conduit 37, as shown in FIG. 7A. The seventeenth conduit 37 is connecting the ninth conduit 29 with the tenth conduit 30 so that the heat transfer fluid may be prevented from flowing through the radiator 8. The by-pass valve 20 is as shown in FIG. 7A arranged in the ninth conduit 29 and the sixth connection point 46 is arranged in the tenth conduit 30. The by-pass valve 20 may for example be a three-way valve with one inlet port and two outlet ports. The inlet port and one of the outlet ports of the by-pass valve 20 are arranged so that they are connected in the ninth conduit 29. Depending on the valve position of the by-pass valve 20 the heat transfer fluid is through this arrangement allowed to flow through the by-pass valve in the ninth conduit 29 to the radiator 8 if desired, as shown in FIG. 7B. The other outlet port of the by-pass valve 20 is arranged so that it is connected to the seventeenth conduit 37. Depending on the valve position of the by-pass valve 20 the heat transfer fluid is through this arrangement allowed to flow through the seventeenth conduit by-passing the radiator if desired, as shown in FIG. 7C.

In FIG. 7B, a configuration is schematically shown, where the by-pass valve 20 is positioned in a first valve position 20a, where the heat transfer fluid is flowing through the radiator 8. In this configuration, the by-pass valve 20 is controlled into the first valve position 20a, where the heat transfer fluid is prevented from flowing through the seventeenth conduit 37, and instead is flowing in the ninth conduit 29 through the by-pass valve 20, and further from the by-pass valve 20 in the ninth conduit 29 to the radiator 8, and from the radiator 8 in the tenth conduit 30 to the sixth connection point 46, and further from the sixth connection point 46 in the tenth conduit 30. This configuration may be used for heating or cooling the heat transfer fluid with the radiator 8.

Figure 7C:
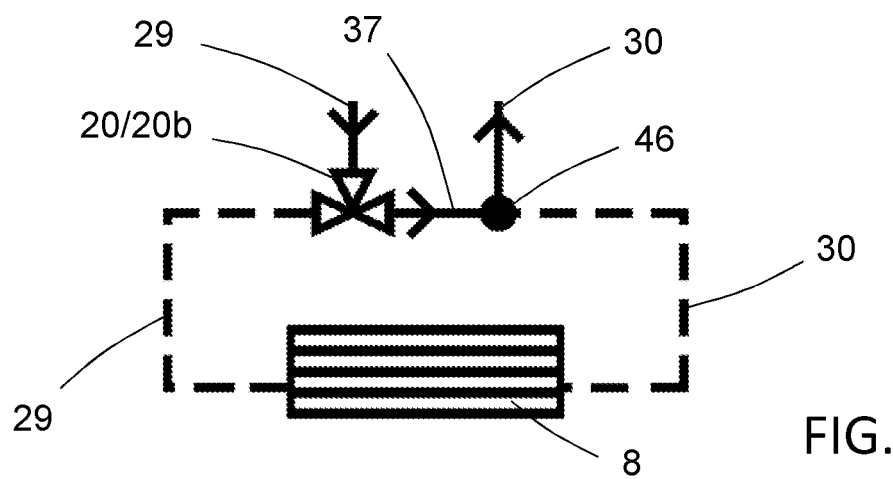

In FIG. 7C, a radiator by-pass configuration is schematically shown, where the by-pass valve 20 is positioned in a second valve position 20b, where the heat transfer fluid is by-passing the radiator 8. In this configuration, the by-pass valve 20 is controlled into the second valve position 20b, where the heat transfer fluid is prevented from flowing through the radiator 8, and instead is flowing in the ninth conduit 29 to the by-pass valve 20, from the by-pass valve 20 in the seventeenth conduit 37 to the sixth connection point 46, and from the sixth connection point 46 in the tenth conduit 30. This configuration may be used to prevent a pressure drop in the system that may occur when the heat transfer fluid is flowing through the radiator 8.

In the different embodiments described, the valves used may for example be three-way valves having an inlet port, a first outlet port and a second outlet port, where each three-way valve is controllable into the first valve position and the second valve position. In FIGS. 6A-6D, the different valve positions are illustrated, and the flow through the valves in the different valve positions are indicated with arrows. Any type of three-way valves suitable for controlling the flow in a vehicle thermal management system may be used.

The connection points in the different embodiments described may be of any suitable conventional configuration used in vehicle thermal management systems. The connection points described may for example be branch couplings having a three-way configuration supporting the flow pattern in the different loops. If needed the couplings may be arranged with valves for controlling the flow of heat transfer fluid, such as for example check valves.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS | | | |
|---|---|---|---|
| 1: | Thermal system | | |
| 2: | Refrigerant system | | |
| 3: | First valve | | |
| 3a: | First valve position, first valve | | |
| 3b: | Second valve position, first valve | | |
| 4: | Second valve | | |
| 4a: | First valve position, second valve | | |
| 4b: | Second valve position, second valve | | |
| 5: | First unit | | |
| 6: | Second unit | | |
| 7: | Chiller | | |
| 8: | Radiator | | |
| 9: | Connected thermal control loop | | |
| 10a: | First separated thermal control loop | | |
| 10b: | Second separated thermal control loop | | |
| 11a: | Third separated thermal control loop | | |
| 11b: | Fourth separated thermal control loop | | |
| 12: | First circulation pump | | |
| 13: | Second circulation pump | | |
| 14: | First separator | | |
| 15: | Second separator | | |
| 16: | First expansion tank | | |
| 17: | Second expansion tank | | |
| 18: | Third valve | | |
| 18a: | First valve position, third valve | | |
| 18b: | Second valve position, third valve | | |
| 19: | Fourth valve | | |
| 19a: | First valve position, fourth valve | | |
| 19b: | Second valve position, fourth valve | | |
| 20: | By-pass valve | | |
| 21: | First conduit | | |
| 22: | Second conduit | | |
| 23: | Third conduit | | |
| 24: | Fourth conduit | | |
| 25: | Fifth conduit | | |
| 26: | Sixth conduit | | |
| 27: | Seventh conduit | | |
| 28: | Eighth conduit | | |
| 29: | Ninth conduit | | |
| 30: | Tenth conduit | | |
| 31: | Eleventh conduit | | |
| 32: | Twelfth conduit | 33: | Thirteenth conduit |
| 34: | Fourteenth conduit | 35: | Fifteenth conduit |
| 36: | Sixteenth conduit | 37: | Seventeenth conduit |
| 41: | First connection point | 42: | Second connection point |
| 43: | Third connection point | 44: | Fourth connection point |
| 45: | Fifth connection point | 46: | Sixth connection point |
| 51: | First condenser | 52: | Second condenser |
| 53: | Evaporator | 54: | Accumulator tank |
| 55: | Compressor | 60: | Control unit |

The invention claimed is:

1. A vehicle thermal management system comprising a refrigerant system, a first valve, a second valve, a third valve, a first thermally managed assembly, a second thermally managed assembly, a chiller, and a radiator, wherein the chiller is connected to the refrigerant system, and the chiller and the radiator are respectively arranged for cooling and/or heating the first thermally managed assembly and/or the second unit thermally managed assembly;

wherein, in a connected mode for cooling or heating the first thermally managed assembly and the second thermally managed assembly, the first unit thermally managed assembly and the second thermally managed assembly are connected to each other via the first valve, the second valve, and the third valve, and the first thermally managed assembly and the second thermally managed assembly are connected to the chiller and/or the radiator in a connected thermal control loop;

wherein, in separated modes for cooling and/or heating the first thermally managed assembly and/or the second thermally managed assembly, the first unit thermally managed assembly and the second thermally managed assembly are separated from each other via the first valve, the second valve and the third valve; the separated modes include:

a first separated mode, wherein the first thermally managed assembly is connected to the chiller in a first separated thermal control loop and the second thermally managed assembly is connected to the radiator in a second separated thermal control loop; and a second separated mode, wherein the first thermally managed assembly is connected to the radiator in a third separated thermal control loop and the second thermally managed assembly is connected to the chiller in a fourth separated thermal control loop;

wherein each of the first valve, the second valve and the third valve is controlled into one of a first valve position or a second valve position, and depending on the respective valve positions, the connected or separated thermal control loops are formed.

2. A vehicle thermal management system according to claim 1, wherein, in the first separated mode, the first separated thermal control loop and the second separated thermal control loop have different temperature ranges; and wherein, in the second separated mode, the third separated thermal control loop and the fourth separated thermal control loop have different temperature ranges.

3. A vehicle thermal management system according to claim 1, wherein the system further comprises a first circulation pump and a second circulation pump that circulate heat transfer fluid in the connected or separated thermal control loops.

4. A vehicle thermal management system according to claim 3, wherein heat transfer fluid is circulated in the first separated thermal control loop and the third separated thermal control loop by the first circulation pump, and heat transfer fluid is circulated in the second separated thermal control loop and the fourth separated thermal control loop by the second circulation pump.

5. A vehicle thermal management system according to claim 3, wherein heat transfer fluid is circulated in the connected thermal control loop by the first circulation pump and/or the second circulation pump.

6. A vehicle thermal management system according to claim 1, wherein, in the first separated mode, the first valve is positioned in the first valve position, the second valve is positioned in the first valve position, and the third valve is positioned in the first valve position.

7. A vehicle thermal management system according to claim 1, wherein, in the second separated mode, the first valve is positioned in the second valve position, the second valve is positioned in the second valve position and the third valve is positioned in the second valve position.

8. A vehicle thermal management system according to claim 1, wherein, in the first separated mode:

the first separated thermal control loop comprises the first thermally managed assembly connected to the first valve via a first conduit, the first valve connected to the chiller via a second conduit and a third conduit, the chiller connected to the third valve via a fourth conduit, the third valve connected to the first thermally managed assembly via a fifth conduit and a sixth conduit; and the second separated thermal control loop comprises the second thermally managed assembly connected to the second valve via a seventh conduit, the second valve connected to the radiator via an eighth conduit and a ninth conduit, the radiator connected to the second thermally managed assembly via a tenth conduit, an eleventh conduit and a twelfth conduit.

9. A vehicle thermal management system according to claim 1, wherein, in the second separated mode:

the third separated thermal control loop comprises the first thermally managed assembly connected to the first valve via the first conduit, the first valve connected to the radiator via a thirteenth conduit and the ninth conduit, the radiator connected to the first thermally managed assembly via the tenth conduit, a fourteenth conduit and the sixth conduit; and the fourth separated thermal control loop comprises the second thermally managed assembly connected to the second valve via the seventh conduit, the second valve connected to the chiller via a fifteenth conduit and the third conduit, the chiller connected to the third valve via the fourth conduit, the third valve connected to the second thermally managed assembly via a sixteenth conduit and the twelfth conduit.

10. A vehicle thermal management system according to claim 8, wherein the system further comprises a first circulation pump and a second circulation pump that circulate heat transfer fluid in the connected or separated thermal control loops, and wherein the first circulation pump is arranged in the sixth conduit and the second circulation pump is arranged in the twelfth conduit.

11. A vehicle thermal management system according to claim 8, wherein the system further comprises a fourth valve controllable into a first valve position and a second valve position;

wherein, in the separated modes for cooling and/or heating the first thermally managed assembly and/or the second thermally managed assembly, the first thermally managed assembly and the second thermally managed assembly are fully separated from each other via the first valve, the second valve, the third valve, and the fourth valve;

wherein, in the first separated mode, the second separated thermal control loop comprises the radiator connected to the fourth valve via the tenth conduit, and the fourth valve connected to the second thermally managed assembly via the eleventh conduit and the twelfth conduit;

wherein, in the second separated mode, the third separated thermal control loop comprises the radiator connected to the fourth valve via the tenth conduit, the fourth valve connected to the first thermally managed assembly via the fourteenth conduit and the sixth conduit.

12. A vehicle thermal management system according to claim 1, wherein the first thermally managed assembly is a battery temperature-regulator.

13. A vehicle thermal management system according to claim 1, wherein the second thermally managed assembly is a power electronics temperature-regulator.

14. A vehicle thermal management system according to claim 1, wherein the system further comprises a control unit that controls each of the valves into the first valve position and the second valve position.

15. A vehicle thermal management system according to claim 1, wherein the valves are each a three-way valve having an inlet port, a first outlet port and a second outlet port, and
  wherein each three-way valve is controlled to be in either the first valve position or the second valve position.

16. A vehicle comprising the vehicle thermal management system according to claim 1.

\* \* \* \* \*